US011461212B2

(12) United States Patent
Schumacher

(10) Patent No.: US 11,461,212 B2
(45) Date of Patent: Oct. 4, 2022

(54) APPARATUS AND METHOD FOR DETERMINING THE UNDERLYING CAUSE OF USER EXPERIENCE DEGRADATION

(71) Applicant: Lakeside Software, LLC, Bloomfield Hills, MI (US)

(72) Inventor: Matthew R. Schumacher, Orchard Lake, MI (US)

(73) Assignee: Lakeside Software, LLC, Bloomfield Hills, MI (US)

( * ) Notice: Subject to any disclaimer, the term of this patent is extended or adjusted under 35 U.S.C. 154(b) by 218 days.

(21) Appl. No.: 16/669,630

(22) Filed: Oct. 31, 2019

(65) Prior Publication Data

US 2020/0257606 A1  Aug. 13, 2020

Related U.S. Application Data

(60) Provisional application No. 62/804,363, filed on Feb. 12, 2019.

(51) Int. Cl.
  *G06F 11/00* (2006.01)
  *G06F 11/34* (2006.01)
  *G06F 11/32* (2006.01)

(52) U.S. Cl.
  CPC ........ *G06F 11/3419* (2013.01); *G06F 11/327* (2013.01); *G06F 11/3476* (2013.01)

(58) Field of Classification Search
  CPC ............. G06F 11/3409; G06F 11/3006; G06F 11/3452; G06F 11/3072; G06F 11/3466; G06F 11/3476; G06F 11/3604
  See application file for complete search history.

(56) References Cited

U.S. PATENT DOCUMENTS

| 7,865,499 | B2 | 1/2011 | Schumacher | |
|---|---|---|---|---|
| 10,154,429 | B1 | 12/2018 | Sharoni et al. | |
| 10,237,144 | B2 | 3/2019 | Yoon et al. | |
| 2004/0250261 | A1* | 12/2004 | Huibregtse | G06F 9/542 719/318 |
| 2013/0332594 | A1* | 12/2013 | Dvir | G06F 11/00 709/224 |
| 2014/0324862 | A1* | 10/2014 | Bingham | G06F 16/26 707/737 |
| 2015/0199252 | A1* | 7/2015 | Ilangovan | G06F 11/3409 702/186 |
| 2018/0060422 | A1 | 3/2018 | Wegryn et al. | |

\* cited by examiner

*Primary Examiner* — Charles Ehne
(74) *Attorney, Agent, or Firm* — Dykema Gossett PLLC

(57) ABSTRACT

An apparatus for determining candidate causes of a user experience degradation includes a data collection agent to collect inventory data associated with a managed computer system, a change recording system to process the inventory data and determine any changes and to record change records including time-stamps, an alert detection system to detect alerts (alarms and sensors) including time-duration information and storing alert records, an analysis module to select alert records based on whether the alert, using the time-duration information, occurred in a predetermined lookback period, and identify, for each selected alert records, corresponding change records that precede in time the selected alert records. A user reporting interface outputs the identified change records as the candidate causes. A plurality of managed computers includes condensing agents to transmit respective alert and change records to a master computer system for correlation analysis, and outputting candidate causes based upon the analysis.

25 Claims, 9 Drawing Sheets

| Alarm No. | Trigger (Condition) | State | Applicability Criteria |
|---|---|---|---|
| 1 | Event -1 | Active | AC-1 |
| 2 | M.V.>TH | Inactive | AC-1 |
| . | . | . | . |
| . | . | . | . |
| . | . | . | . |
| N | Event-2 | Active | AC-2 |

| Sensor No. | Trigger (Condition) | State | Applicability Criteria |
|---|---|---|---|
| 1 | Event -1<br>Event - 2<br>M.V.>TH | Inactive | AC-1 |
| 2 | M.V.>TH | Active | AC-1 |
| . | . | . | . |
| N | Event - 3<br>Event - 4 | Active | AC-1 |

| WGUID | FIELDNAME | TABLENAME | KEYNAME | OLD VALUE | NEW VALUE | CHANGETIME | CHANGETYPE | CHGDESC | CHGCLASS | CHGNUMBER |
|---|---|---|---|---|---|---|---|---|---|---|
| ENGPBHVMS01.ENGI.LAKESIDESOFTWARE.ORG | (ID=162) | SASYSDRV (ID=1164) | WNAME = ##STRID(MpKsl3345444f)## | | | 1/20/2019 17:59 | Delete | MpKsl3345444f | System Drivers (ID=2345) | 75952 |
| ENGPBHVMS01.ENGI.LAKESIDESOFTWARE.ORG | (ID=162) | SASFW (ID=620) | PACKAGE = ##STRID(Definition Update fo Microsoft Security Essentials - KB2310138 (Definition 1.283.3348.0))## AND PUB = ##STRID()## AND DISPLAYVER = ##STRID()# | | | 1/20/2019 17:59 | Delete | Definition Update for Microsoft Security Essentials - KB2310138 (Definition 1.283.3348.0) | Software (ID=621) | 75951 |
| ENGPBHVMS01.ENGI.LAKESIDESOFTWARE.ORG | (ID=162) | SASFW (ID=620) | PACKAGE = ##STRID(Definition Update fo Microsoft Security Essentials - KB2310138 (Definition 1.283.3368.0))## AND PUB = ##STRID()## AND DISPLAYVER = ##STRID()# | | | 1/20/2019 17:59 | Add | Definition Update for Microsoft Security Essentials - KB2310138 (Definition 1.283.3368.0) | Software (ID=621) | 75950 |
| ENGPBHVMS01.ENGI.LAKESIDESOFTWARE.ORG | (ID=162) | SASFWUPDATES (ID=4906) | TITLE_ID = ##STRID(Definition Update for Microsoft Security Essentials - KB2310138 (Definition 1.283.3361.0))## | | | 1/20/2019 14:19 | Add | Definition Update for Microsoft Security Essentials - KB2310138 (Definition 1.283.3361.0) | (ID=162) | 75948 |
| ENGPBHVMS01.ENGI.LAKESIDESOFTWARE.ORG | (ID=162) | SASFWUPDATES (ID=4906) | TITLE_ID = ##STRID(Definition Update for Microsoft Security Essentials - KB2310138 (Definition 1.283.3300.0))## | | | 1/20/2019 14:19 | Delete | Definition Update for Microsoft Security Essentials - KB2310138 (Definition 1.283.3300.0) | (ID=162) | 75949 |
| ENGPBHVMS01.ENGI.LAKESIDESOFTWARE.ORG | (ID=162) | SASYSDRV (ID=1164) | WNAME = ##STRID(MpKsl3345444f)## | | | 1/20/2019 10:59 | Add | MpKsl3345444f | System Drivers (ID=2345) | 75947 |
| ENGPBHVMS01.ENGI.LAKESIDESOFTWARE.ORG | (ID=162) | SASFW (ID=620) | PACKAGE = ##STRID(Definition Update fo Microsoft Security Essentials - KB2310138 (Definition 1.283.3348.0))## AND PUB = ##STRID()## AND DISPLAYVER = ##STRID()# | | | 1/20/2019 10:58 | Add | Definition Update for Microsoft Security Essentials - KB2310138 (Definition 1.283.3348.0) | Software (ID=621) | 75946 |

FIG. 12

| WGUID | ALM CLASS | ALM TYPE | ALM ITEM | SEVERITY | START TIM | END TIM | LIMIT | MEASURED | ACT TAKEN | ALM INST | CLEARED BY | ALMN UMBER | ACT TAKEN ID | REC FLAG S | PID |
|---|---|---|---|---|---|---|---|---|---|---|---|---|---|---|---|
| ENGPBHVMS01.ENGI.LAKESIDESOFTWARE.ORG | System | Process or Queue Length | Computer | Yellow | 1/20/2019 2:58 | 1/20/2019 3:02 | 4.0 queue entries | 5.3 queue entries | | | Systems Management Agent | 47038 | | Local | -1 |
| ENGPBHVMS01.ENGI.LAKESIDESOFTWARE.ORG | System | Transition Fault Ratio | Computer | Yellow | 1/19/2019 23:38 | 1/20/2019 1:58 | 70.00% | 86.10% | | | Systems Management Agent | 47037 | | Local | -1 |
| ENGPBHVMS01.ENGI.LAKESIDESOFTWARE.ORG | System | Page Fault Rate | Computer | Yellow | 1/19/2019 22:49 | 1/19/2019 22:59 | 5400.0 page faults per second | 20914.9 page faults per second | | | Systems Management Agent | 47035 | | Local | -1 |
| ENGPBHVMS01.ENGI.LAKESIDESOFTWARE.ORG | System | Page Fault Rate | Computer | Yellow | 1/19/2019 15:57 | 1/19/2019 16:01 | 5400.0 page faults per second | 6885.5 page faults per second | | | Systems Management Agent | 47033 | | Local | -1 |
| ENGPBHVMS01.ENGI.LAKESIDESOFTWARE.ORG | System | Process or Queue Length | Computer | Yellow | 1/19/2019 11:56 | 1/19/2019 12:01 | 4.0 queue entries | 6.0 queue entries | | | Systems Management Agent | 47032 | | Local | -1 |
| ENGPBHVMS01.ENGI.LAKESIDESOFTWARE.ORG | System | Page Fault Rate | Computer | Yellow | 1/19/2019 11:55 | 1/19/2019 12:01 | 5400.0 page faults per second | 10563.4 page faults per second | | | Systems Management Agent | 47031 | | Local | -1 |
| ENGPBHVMS01.ENGI.LAKESIDESOFTWARE.ORG | ICA | Latency - Session Average | ICA | Red | 1/18/2019 23:22 | 1/19/2019 11:56 | 150 | 230 | | Console (mike) | Systems Management Agent | 47029 | | Local | -1 |

FIG. 13

APPARATUS AND METHOD FOR DETERMINING THE UNDERLYING CAUSE OF USER EXPERIENCE DEGRADATION

CROSS-REFERENCE TO RELATED APPLICATIONS

This application claims the benefit of U.S. provisional application No. 62/804,363, filed 12 Feb. 2019 (the '363 application), which is hereby incorporated by reference as though fully set forth herein.

BACKGROUND a. Technical Field

This disclosure relates to an apparatus and method for determining an underlying cause of user experience degradation.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Desktop computing systems such as Microsoft Windows are very complex systems. They include hardware and firmware components, operating system software, drivers and kernel components, software packages and applications, and a myriad of configuration settings and data. They are made even more complex because these components are contributed from numerous sources and updated on an individual basis (in the case of software-related components) or as determined by the user with respect to hardware components. Configuration and settings may also be changed frequently.

Because of the large number of components and the complexity both of individual components and the system as a whole, with many documented and undocumented interfaces between such components, errors sometimes occur. Errors may be in the form of software bugs, faulty hardware, incompatible components, improperly installed or configured elements, and other external conditions on which the system may depend. The system, when considered as a whole, is continuously under change. Further, in an enterprise containing many such computing systems, these updates are not synchronized; changes occur at different times and in different orders on each system.

When problems develop, the user of the computing system often does not see the actual problem condition, but rather symptoms that result from the underlying problem. As a simple example, an application may fail to perform its function because the disk drive used to store data is full, which resulted from a different application that fills the disk with logs or other information.

Organizations employ very sophisticated Information Technology (IT) staff members to keep systems and applications running. When users report problems, it is challenging for even skilled personnel to diagnose problems and relate symptoms to the underlying cause. Often, troubleshooting involves viewing many example cases, trial-and-error review of the hardware, software, and configuration, all of which is time-consuming experimentation. The results obtained may vary greatly according to the specific experience of the administrative personnel. In some cases, administrators may resort to "blind" restoration of a system to a previous state to start again. In many cases, this is a very time consuming and unpredictable process. Some problems are never really related to a specific cause.

Many, many hours of productivity for the user and troubleshooting time for the administrative staff are wasted. The process of using symptoms to determine the underlying, causative problem is a manual one, and is one prone to failure. The motivation for the present invention is to automate such a process.

The foregoing discussion is intended only to illustrate the present field and should not be taken as a disavowal of claim scope.

SUMMARY

Embodiments consistent with the instant disclosure differ from the known art in that there are no known practical solutions to one or more of the above-identified problems, other than the use of human investigation.

A method according to an embodiment of the instant teachings determines one or more candidate causes of a user experience degradation of a managed computer system. In an embodiment, the candidate causes may comprise changes (e.g., hardware, software, configuration settings, etc.) that were made to one or more of a plurality of managed computers and may further involve a master computer system. The method involves determining changes associated with at least one of the managed computer systems and storing, in a first data store, change records corresponding to the determined changes. The change records include respective time-stamps indicating when a respective change to the managed computer system was determined. In an embodiment, the local data store comprises a local database wherein each managed computer system may have its own local database associated therewith. The method further involves detecting, at each managed computer system, at least one or more alerts associated with the respective managed computer system. The detected alerts may comprise at least one of an activated alarm and an activated sensor. Each detected alert includes respective time-duration information. The method may further comprise storing alert records corresponding to the detected alerts in the respective local database(s). The method still further involves selecting, at each managed computer system, one or more alert records based on qualifying criteria, which qualifying criteria may include whether the alert, based on its associated time-duration information, occurred in a predetermined lookback (time) period, and identifying, for each selected alert record, the corresponding change records that precede in time the selected alert records, based on the time-duration information as well as the time-stamps of the change records. The method also involves outputting the candidate causes based on the identified change records.

In a further embodiment, the steps of determining changes, detecting alerts, selecting alert records, and identifying change records are performed with respect to the plurality of managed computer systems so as to produce a plurality of sets containing selected alerts and the identified change records (i.e., identified as preceding-in-time the alert). The method further comprises transmitting to the master computer system, for each managed computer system, the above-mentioned sets of information containing the selected alert records and the associated change records. The transmitted information may be consolidated in a condensed database. The method further involves determining a respective correlation between the change records and the alert records, and then outputting, for each such alert (e.g., unique alert under being analyzed), the selected change records based on the determined correlation values. Embodiments consistent with the instant teachings allow a user, such as an administrator, to determine an underlying cause of one or more problems, which supports early and automatic remediation of such problems.

An apparatus is also presented.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 12 is a simplified table showing exemplary change records, in an embodiment.

FIG. 13 is a simplified table showing exemplary alert records (i.e., alarms and/or sensors), in an embodiment.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
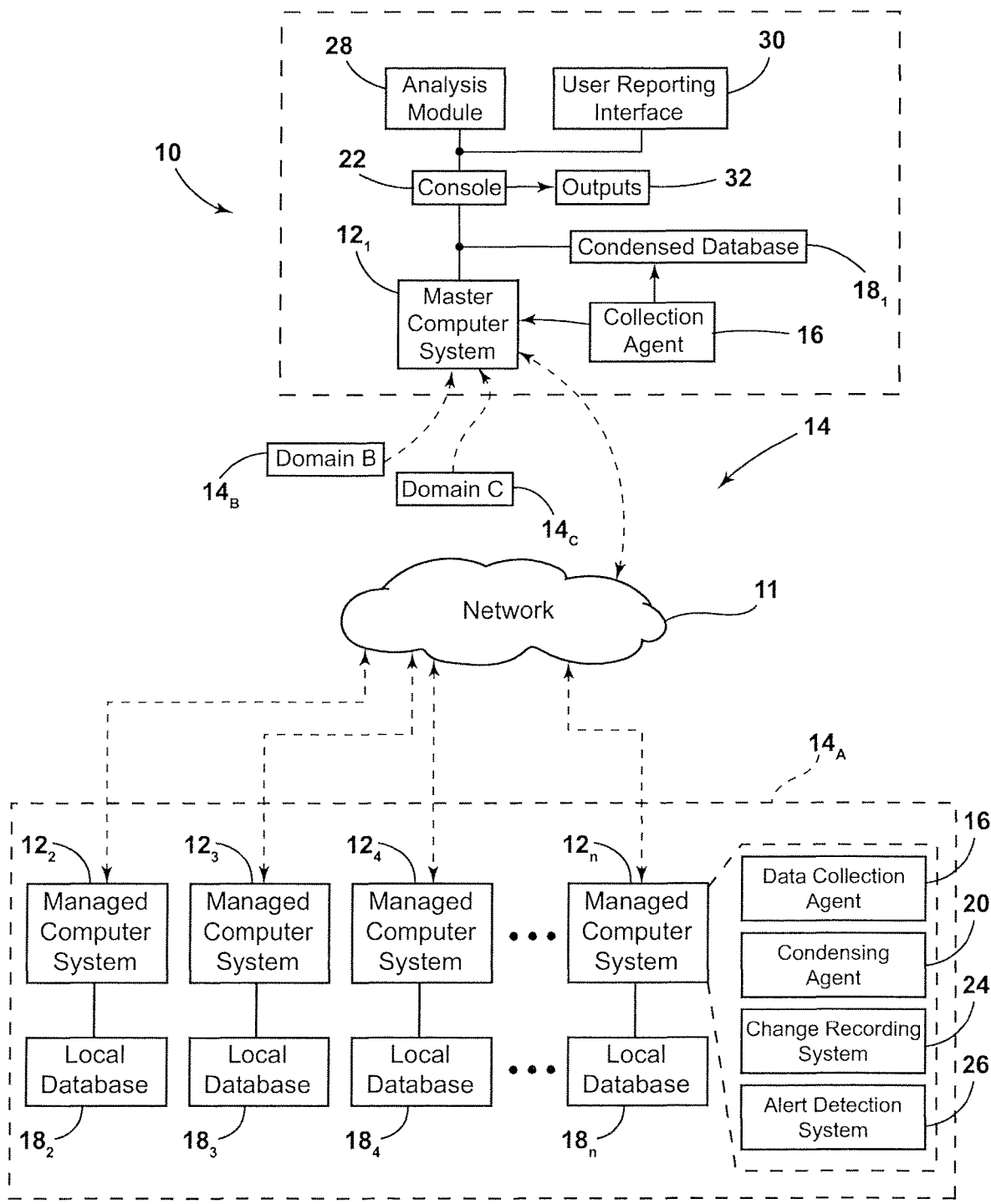
FIG. 1 is a simplified diagrammatic and block diagram view of a distributed computing network in which embodiments for determining one or more candidate causes of a user experience degradation of a computer system may be implemented.

Referring now to the drawings wherein like reference numerals are used to identify identical components in the various views, FIG. 1 shows an apparatus 10 for determining one or more candidate causes of a user experience degradation of a managed computer system. Generally speaking, the candidate causes can be one or more changes that have occurred to the managed computer system in question. In an embodiment, the apparatus 10 may be employed in a distributed computing network, designated generally as network 14. The distributed computing network 14 may include a plurality of computer systems designated $12_1, 12_2, \ldots 12_n$ and may be of the type installed in one or more domains, such as Domain A, designated $14_A$, Domain B, designated $14_B$, and Domain C, designated $14_C$. FIG. 1 also shows a communications network 11 through and over which one or more of the managed computer systems and the master computer system may communicate or otherwise transmit/transfer data/information.

The computer systems $12_1, 12_2, \ldots 12_n$ may be arranged in an hierarchical relationship, wherein computer $12_1$ may be a top-level master node at a headquarters (HQ) location, hereinafter sometimes referred to as a master computer system $12_1$. In another embodiment, the top-level master node may be accessible via the internet in a cloud computing model. The computer systems $12_2, 12_3, 12_4, \ldots 12_n$ may be a workstation type computer systems or server type computer systems, or may be another type of computing endpoint such as a mobile phone, a kiosk, or a special purpose handheld device such as barcode scanner, and may hereinafter sometimes be referred to as local or managed computer systems (also sometimes called a "child" computer system). It should be understood that the number of managed computer systems shown in FIG. 1 are exemplary only and embodiments consistent with the instant teachings are not so limited and may be applicable to a very large number of managed computer systems. Moreover, the managed computer systems are not limited to physically different hardware. For example, in some embodiments, the plurality of managed computer systems can include one or more virtualized computer systems, as known in the art.

In an embodiment, each of the managed computer systems $12_2, 12_3, 12_4, \ldots 12_n$ may include (i) a respective collection agent 16 (e.g., shown in exemplary fashion for managed computer system $12_n$ in FIG. 1), (ii) a respective local or managed data store such as databases $18_2$, $18_3$, $18_4$, ... $18_n$, (iii) a respective condenser module 20 configured to operate as a condensing agent 20 (shown in exemplary fashion for managed computer system $12_n$ in FIG. 1), a respective change recording system 24 (shown in exemplary fashion for managed computer system $12_n$ in FIG. 1), and a respective alert detection module or system 26 (shown in exemplary fashion for managed computer system $12_n$ in FIG. 1) comprising a respective collection of alarms and sensors as described hereinafter.

In an embodiment, the master computer system $12_1$ may include an optional console module 22 used in connection with a workspace analytics system described below, an analysis module 28, a user reporting interface 30, and a block designated as outputs block 32, which in an embodiment, may take the form of a report containing one or more changes that have occurred to a managed computer system that have been determined by apparatus 10 to represent one or more candidate causes of a user experience degradation.

The data collection agent 16 is configured to collect original data, which includes inventory data (e.g., data or information that is generally static in nature) designated by reference numeral 38 (best shown in FIG. 2), which inventory data is associated with various components and operation of a managed computer system $12_i$ (where i is 2 to n) with which the data collection agent 16 is associated. In an embodiment, the data collection agent 16 is configured to operate as a system service on a managed computer $12_i$. The data collection agent 16 is configured to operate substantially continuously and is further configured to record captured original data (including inventory data) into a data store, which may be implemented as a database such as the local or managed databases $18_2$, $18_3$, $18_4$, ... $18_n$ as illustrated in FIG. 1. The collected original data including the inventory data may include, without limitation, performance data, configuration data, hardware and software inventory data, as well as information about the relationships between various entities.

Each local database may be associated with a respective one of the plurality of managed computer systems. In an embodiment, the local databases $18_i$ (where i is 2 to n) may reside (i.e., is saved) directly on the managed computer system $12_i$ with which it is associated, although it should be understand that the local databases may also be stored in shared storage, on a server, in a cloud storage facility, and in another place. In a typical embodiment, each of the local databases $18_i$ may be dedicated to its respective single managed computer system $12_i$ (or a single user thereof), although the sharing of such databases may also be possible.

The condenser module 20 is configured to operate as a condensing agent 20, which is installed on each managed computer system $12_i$ and is configured to run at predetermined times (e.g., periodically) on the managed computer system $12_i$. The condensing agent 20 may also be triggered to run upon demand by the master computer system $12_1$. The condenser module 20 is configured to take the original data/inventory data stored in the local (managed) database $18_i$ as an input and then perform a variety of operations designed to reduce the overall volume of the original/inventory data and in an embodiment to create mathematically interesting analysis of the original data/inventory data, and to output such condensed data as an output. The condenser module 20 is further configured to send the condensed data output to an aggregation point, which, in an embodiment, may be the condensed database $18_1$ associated with the master computer system $12_1$. The condensed data may include at least alert data (i.e., alarm and sensor data) such as alert records as well as change records, as will be described hereinafter. In an embodiment, the condenser module 20 may operate on different time schedules for different types of data, so as to provide flexibility to the implementation, or may be triggered on demand by a signal initiated externally to the system.

The condensed database $18_1$ as described above, contains condensed data originating from the plurality of condensing agents 20 running on the managed computer systems $12_i$. The master computer system $12_1$ has associated therewith software operating thereon that receives the condensed data from the various managed computer systems, may potentially operate on such received data, and then stores it in the condensed database $18_1$. The condensed database $18_1$ itself may exist partially on storage systems and partially in the memory on the master computer system. The condensed database $18_1$ includes both real-time and historical data regarding alarm and sensor state(s) from the managed (child) computer systems. The condensed database $18_1$ also contains change recording information (e.g., change records) from one or more of the managed (child) computer systems.

The change recording system 24 that is included on each managed computer system $12_i$ is configured to evaluate original data, including the inventory data, that is stored in the local database by the data collection agent 16. Since changes to hardware, software, configuration settings and the like may lead to various problems in the operation of the managed computer system, the change recording system 24 is included as a mechanism to identify such changes. In an embodiment, the change recording system 24 makes a record of at least (i) what changes have occurred in the managed computer system and (ii) when (i.e., the time) such changes were detected, which may take the form of a time-stamp. The time of a change can be used, in an embodiment, to time-correlate changes with any subsequently occurring problems (i.e., alert as described below). In a constructed embodiment, the change recording system 24 operates on the managed computer system $12_i$, although it would be possible to perform that work externally in other computing devices, in other embodiments.

The alert detection system 26 is also installed on each managed computer system $12_i$ and is configured to detect the occurrence of one or more alerts associated with the managed computer system. In a different embodiment, the alert detection system 26 could be implemented on a different computer system linked via appropriate networking capabilities. The aforementioned alerts correspond to the problems that may be indicative of a user experience degradation (e.g., high CPU usage resulting in a non-responsive or lagging user interface). In an embodiment, each detected alert comprises one or both of either an activated alarm and/or an activated sensor. Each of the one or more alerts may include respective time-duration information. In an embodiment, the data collection agent 16 on the respective managed computer system $12_i$ is configured to store such alert records—corresponding to the detected alerts—in the local database $18_i$ associated therewith. The time-duration information may include a start time and an end time associated with the alert (i.e., and which is stored in the alert record). As described above, the time-duration information can be used to time-correlate the occurrence of an alert with any preceding-in-time changes that occurred to the managed computer system.

The analysis module 28 is associated with the master computer system $12_1$. The analysis module 28 may be configured to perform a number of statistical operations and has been configured with analytics capabilities configured to take data contained in the condensed database $18_1$ as input. In one embodiment, the analysis module 28 is configured to process alert records (i.e., alarm and sensor data) as well as change records stored in the condensed database $18_1$. In an embodiment, the analysis module 28 is configured to select one or more alert records based on certain qualifying criteria, including whether the alert, based on time-duration information, occurred in a predetermined lookback period. The analysis module 28 is further configured to identify, for each selected alert, any corresponding change records that precede-in-time such selected alert within a predetermined time window. In embodiments, statistical analysis is also conducted by the analysis module 28 in order to determine candidate (i.e., probable) causes based the inputs from the plurality of managed computer systems.

The user reporting interface 30 generally allows the user to interact with the analysis module 28 in order to generate various reports and other information about the what changes constitute candidate (probable) causes of a user experience degradation. In an embodiment, the user reporting interface 30 may be configured in particular to output identified change records, on a per selected alert basis.

Figures 2, 3:
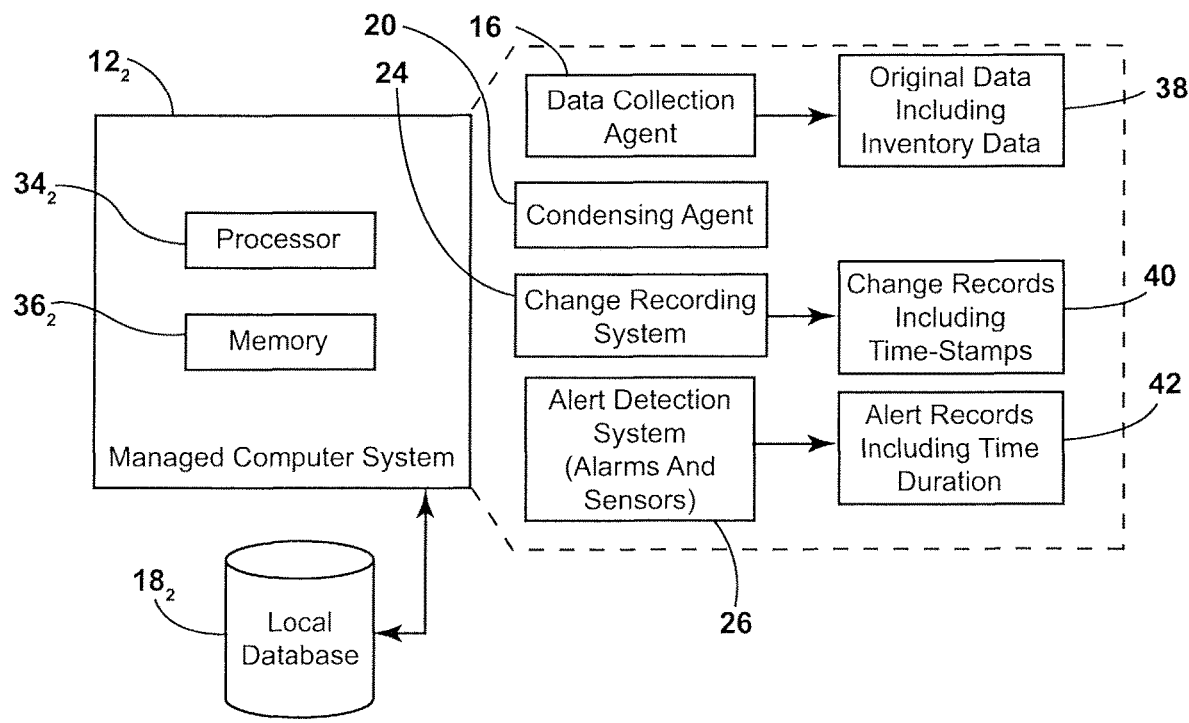
FIG. 2 is a simplified diagrammatic and block diagram view showing, in greater detail, the embodiment of FIG. 1 as implemented in a managed computer system.
FIG. 3 is a simplified table view showing, in greater detail, a plurality of alarms as included in the alert detection system shown in block form in FIG. 2.

FIG. 2 is a simplified diagrammatic and block diagram view showing, in greater detail, aspects of the apparatus 10 as implemented in an exemplary one of the managed computer systems, namely, managed computer system $12_2$ of FIG. 1. In the illustrated embodiment, the managed computer system $12_2$ includes an electronic processor $34_2$ and an associated memory $36_2$. The apparatus 10, as implemented in the managed computer system $12_2$, is configured generally to collect original data (including inventory data) relating to and associated with the managed computer system $12_2$, substantially constantly evaluate the collected data (e.g., inventory data) and determine and record what changes to the managed computer system have occurred and when (i.e., the date and time), and substantially constantly evaluate a collection of alarms and sensors (collectively the "alerts") and determine and record what alert(s) have been activated and when/for how long.

With continued reference to FIG. 2, the processor $34_2$ may include processing capabilities as well as an input/output (I/O) interface through which processor $34_2$ may receive a plurality of input and generate a plurality of outputs. Memory $36_2$ is provided for storage of data and instructions or code (i.e., software) for processor $34_2$. Memory $36_2$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

In an embodiment, memory $36_2$ stores executable code which when executed by the processor $34_2$ performs a number of functions as described herein for the apparatus 10, for example, code to perform the data collection agent 16 functionality as described herein, code to perform the change recording system 24 functionality as described herein, and code to perform the alert detection system 26 functionality described herein. All of these functions together contribute to the overall performance of the method and apparatus for determining one or more candidate causes of a user experience degradation of a managed computer system, described herein. In addition, more generally, the managed computer systems will include (1) an operating system (not illustrated) where the managed computer system may be a Windows-based computer, macOS-based computer, a Linux-based computer, a mobile phone, a kiosk, a special purpose handheld device such as barcode scanner, or an Android-based computer and (2) a plurality of application programs suited in function and operation to the purpose(s) of the user(s) of the managed computer system.

With continued reference to FIG. 2, the data collection agent 16 may be configured to use various operating system application programming interfaces (APIs), access various existing collections of data of interest, and perform various direct observations of user, application, system activity, peripheral, hardware, software, and other aspects of operation. The data collection agent 16 may be further configured to directly record such observations (i.e., the original data including the inventory data 38) in the local data store (i.e., associated local database 18), and/or be configured to perform first-level analytics on the data to make decisions about what to save and/or perform various functions, such as mathematical transformations, on the observed/collected data. In an alternative embodiment, the local data store may be present on external storage or another computing system. The data collection agent 16 is configured to monitor and collect many types of information, including without limitation performance data, configuration data, hardware and software inventory data, system health, connectivity including network connectivity, computing resource availability and usage, information about the relationships between various entities (see U.S. application Ser. No. 15/629,189 (the '189 application) incorporated by reference in its entirety), as well as other information.

It should be understood that the data collection agent 16 on each managed computer system $12_i$ gathers information that may be relevant for many different purposes. And while embodiments consistent with the instant teachings may be used primarily for end-user facing devices, like desktops, notebooks, laptops, mobile devices, and other endpoints such as a kiosk or a special purpose handheld device such as barcode scanner, it should be appreciated that such embodiments are equally operable on server computer platforms.

As mentioned above, among the information collected by the data collection agent 16 includes inventory data. Such data is often relatively static in nature, in that changes to it are relatively infrequent. In addition to the existence of certain types of hardware and certain software packages, the configuration and other aspects of such inventory items are also monitored and collected. As the data collection agent 16 of a managed computer system $12_i$ gathers and saves such information into the local database $18_i$, such inventory data is also monitored for changes by the change recording system 24 described herein.

In an embodiment, the data collection/analysis functionality that is performed by the data collection agent 16 may be implemented, at least in-part, by a workspace analytics system, which may be a commercial product available under the trade designation SYSTRACK from Lakeside Software, Inc., Bloomfield Hills, Mich. USA. In an embodiment, the SYSTRACK analytics platform provides enterprise IT with the business intelligence to address a broad set of operational and security requirements, empowering them to make better decisions, dramatically improve productivity and reduce costs. The SYSTRACK platform furthermore can monitor Windows-based computers, macOS-based computers, Linux-based computers, and Android-based computers. Further details of an exemplary workspace analytics system may be seen by reference to U.S. application Ser. No.

11/268,012 (the '012 application), now U.S. Pat. No. 7,865,499, entitled "SYSTEM AND METHOD FOR MANAGING INFORMATION FOR A PLURALITY OF COMPUTER SYSTEMS IN A DISTRIBUTED NETWORK" and U.S. application Ser. No. 15/629,189 (the '189 application), published as US PG PUB 2018/0060422, entitled "METHOD AND APPARATUS FOR NATURAL LANGUAGE QUERY IN A WORKSPACE ANALYTICS SYSTEM". The '012 application and the '189 application are both hereby incorporated by reference as though fully set forth herein.

The change recording system 24 is included in each managed computer system $12_i$ and is configured to process the original data (including the inventory data) from its associated local database $18_i$ and determine whether any changes associated with components of the managed computer system $12_i$ have occurred (and when). For example, change recording system 24 is installed on the first managed computer system $12_2$ and analyzes the computer system $12_i$ and original/inventory data stored in the associated managed database $18_2$ and then determines whether any changes have occurred to the first managed computer system $12_2$. For further example, change recording system 24 may also be installed on the second managed computer system $12_3$ and analyzes the original/inventory data stored in the associated managed database $18_3$ and then determines any changes to the second managed computer system $12_3$ and so on with any other managed computer systems.

In an embodiment, the change recording system 24 detects changes by comparing the current gathered data with previously gathered information to detect changes, for example, as either an "add", "change" or a "delete" (e.g., of a hardware or software component). As additional example, the change recording system 24 can detect changed values and settings performed by a straightforward comparison of old and new data values. When the system 24 detects such changes, a change log is created and/or maintained/updated in the local database $18_i$ such that it is possible to know what inventory item has changed, what an old setting/value was and what the new setting/value is and when (i.e., the time) this change occurred. In most cases, the time at which the change was detected is used as the time when the change occurred. The inventory data collected by data collection agent 16 may be evaluated either on a polling basis, where the time interval for when to conduct the check/comparison, is configurable (user configurable) or on an event-driven basis. In another embodiment, the change recording system 24 is configured to detect changes in resource utilization patterns, health, performance, and other key indicators by using the same notion of comparing old and new values, and then updating the change log when necessary. The instant teachings allows for the leveraging of many types of change information.

As mentioned above, changes in utilization patterns can also be detected as changes herein. It is possible for the change recording system 24 to compare available disk storage space against a previously taken measurement and conclude that a very rapid reduction has occurred; it may record this as a substantial change in utilization. As an example of a detected change, the apparatus 10 may detect that a windows operating system patch is installed that was not installed as of the previous software patch inventory review. This would be recorded as a "add" change for the software patch inventory item. As yet another example of change detection, consider the removal of a connected USB device from the system (such as a mouse) and replacement with a different device. This may be detected as two changes, a device removal and a device addition. These would also be recorded in the change log.

FIG. 12 is a simplified table of the above-described change log in the form of a table showing exemplary change records. The change recording system 24, for each managed computer system $12_i$ on which it is installed, is further configured to record in the associated local database $18_i$ one or more change records. The change records are designated by reference numeral 40 in FIG. 2 and correspond to the determined changes detected by the change recording system 24 itself. The change records 40 include respective time-stamps indicating when a respective change was determined, which may be used as a proxy for when a change occurred, in an embodiment.

A number of example change records 40 are shown in the table in FIG. 12, wherein among other things a first column called WGUID contains information describing the managed computer system, second and third columns FIELDNAME and TABLENAME contain information describing the table name of the field thereof in the database from which the change was determined, a further column called CHANGETIME contains information describing when the change was determined (e.g., "1/20/2019 17:59"), a further column called CHANGETYPE contains information about whether the change is an "Add", a "Change", or a "Delete", and a further column called CHGDESC which contains information that describes what was changed (e.g., "Definition Update for Microsoft Security Essentials—KB2310138 (Definition 1.283.3348.0)").

With reference again to FIG. 2, the alert detection system 26 installed on each managed computer system $12_i$ is configured to detect the occurrence of one or more alerts associated with the managed computer system $12_i$. The alert detection system 26 then records the one or more detected alerts as alert records 42 in the local database $18_i$. As used herein, an alert comprises at least one of an alarm and a sensor and each alert can assume either an active or an inactive state. The alert detection system 26 is configured to allow the definition of, for each alarm, a respective one or more alarm conditions to be associated therewith, wherein each alarm is triggered (activated) when the monitored alarm condition(s) occurs. The alert detection system 26 is also configured to allow the definition of, for each sensor, a respective one or more sensor conditions to be associated therewith, wherein each sensor is configured to monitor and makes decisions about whether a particular kind of problem exists (i.e., the sensor being triggered or activated when the monitored sensor condition(s) and/or trigger events occur and/or are deemed satisfied). For example, a defined sensor might be configured to monitor and then detect when an application program is consuming too much CPU resources (i.e., a threshold percentage of CPU utilization may be defined in advanced or learned from past behavior learned and stored in the local database).

In a constructed embodiment, there are approximately 100 defined alarms and approximately 600 defined sensors. It should be understood that is it possible to increase/augment these alerts (i.e., alarms/sensors) with additional capabilities over time or decrease as needed. In an embodiment, the alarm detection functionality may be programmed into a managed computer system, while the sensor detection functionality may be dynamically updated and added so as to increase the coverage of any detectable problems. Each alarm and/or sensor is either in an activated state (if it detects a problem) or an inactivated state (if no such problem is detected). The data collection agent 16 may be configured to capture the state of the alarms and sensors, and records such activated alarms and sensors (e.g., as alert records) in the local database $18_i$. In a constructed embodiment, the alert detection system 26 may be configured to check/evaluate alarms at predetermined time intervals (e.g., every fifteen seconds) and check/evaluate sensors at predetermined time intervals (e.g., update every five minutes), although it should be understood that the above-mentioned timing is exemplary only and that adjustment of these values is possible. Additionally, sensors have a notion of inapplicability, for example, a sensor that monitors conditions on a virtualized computer system may not be evaluated on a physical computer system, as the underlying conditions can be irrelevant.

As noted above, an alert comprise either or both an alarm and/or a sensor and in this regard, FIG. 3 is a simplified table 46 showing in greater detail a plurality of alarms as included in the alert detection system 26. Alarms may be defined by relatively straightforward detection mechanisms, typically either driven by a single event or driven as a measured value exceeding a configured threshold for a period of time. For example, an alarm no. 1 (i.e., the first row of the table 46 in FIG. 3) has a defined alarm condition corresponding to the occurrence of a first event designated EVENT-1. As further shown, alarm no. 1 is currently shown in an active state. Also, to the extent the alarm has any applicability conditions that are a prerequisite to be satisfied, this is defined generally in the table as AC-1. As a further example, an alarm no. 2 is defined to have an alarm condition (trigger) which is satisfied when a measured value exceeds a threshold value (e.g., M.V.>TH). As further example, alarm no. n has an associated alarm condition (trigger) corresponding to the occurrence of Event-2 (i.e., which may be different than the Event-1 associated with alarm no. 1), and also has a different applicability condition(s) (e.g., AC-2).

Figures 4, 5:
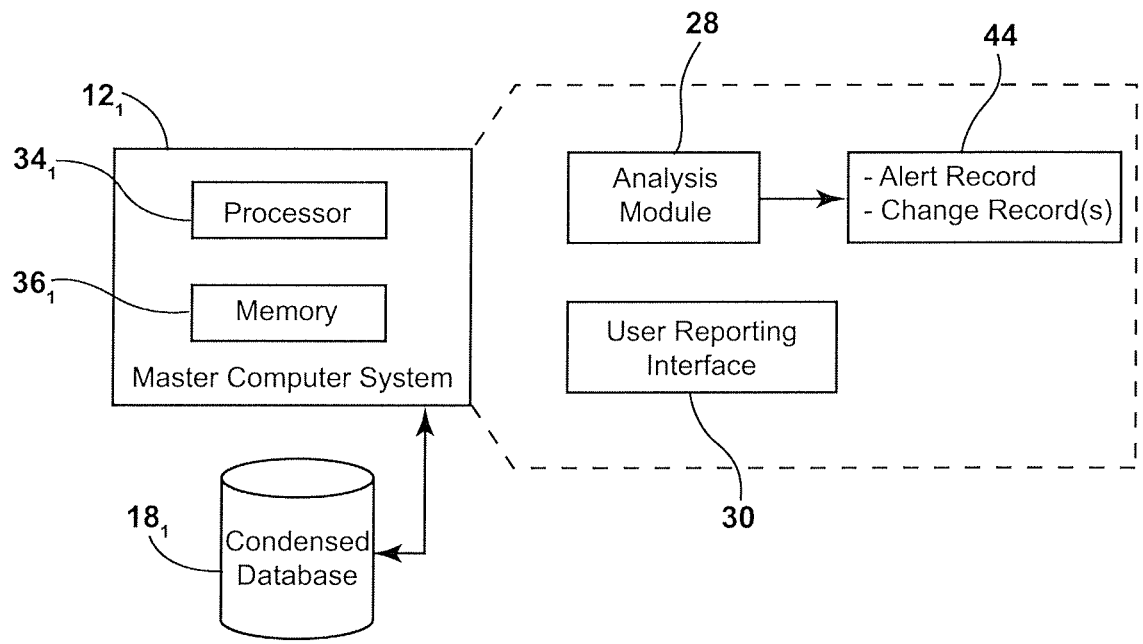
FIG. 4 is a simplified table view showing, in greater detail, a plurality of sensors as included in the alert detection system shown in block form in FIG. 2.
FIG. 5 is a simplified diagrammatic and block diagram view showing, in greater detail, the embodiment of FIG. 1 as implemented in a master computer system.

FIG. 4 is a simplified table 48 showing in greater detail a plurality of sensors as included in the alert detection system 26. Sensors, in contrast to alarms, may be configured to be more flexible and potentially more complex than alarms, and may be configured to allow for the detection of complex conditions using an array of conditions, logic, artificial intelligence (AI) techniques, and the like. For example, the sensor no. 1 in FIG. 4 (i.e., the first row of the table 48) has associated therewith three defined sensor conditions, such sensor conditions corresponding to the occurrence of a first event EVENT-1, the occurrence of a second event EVENT-2, and a satisfied condition where a measured value is greater than a predetermined threshold (e.g., M.V.>TH). The state of the sensor no. 1 in table 48 is currently INACTIVE, and an applicability criteria is defined as a first applicability criteria, designated AC-1 (e.g., Is the managed computer system a physical system, compared to a virtualized system?). Both alarms and sensors may be evaluated by the alert detection system 26 based on predetermined, specific configured time intervals, which values may be selected so as to approximate real-time monitoring, in an embodiment.

The alert detection system 26 is configured to record the state of both alarms and sensors in the local database $18_i$, as shown in FIGS. 3-4 in the "STATE" column. During operation, the condensing agent 20 may be configured to send the state(s) of the alarms/sensors to the condensed database $18_1$ and such data may be sent on pre-configured time intervals or on an event-driven interval basis, and may be triggered as a result of the state of the alarm or sensor itself, in an embodiment. It should be appreciated that alarms and sensors have a notion of being activated or on, or deactivated or off. When the apparatus 10 performs real time diagnostics, for example, there may be an interest in determining which alarms/sensors are active "right now" (i.e., in real time). But the apparatus 10 is also configured to keep a history of when the alarms and sensors go on and when they go off. That history is also useful, for example, in an analysis that may seek to identify "newly activated" alarms and sensors, where they were not recently activated. Some activations may naturally go on and off, but knowing when one is activated and has not previously been activated is helpful in asserting cause claims.

FIG. 13 is a simplified table showing a number of exemplary alert records 42, wherein among other things a first column of the table is called WGUID which contains information describing the managed computer system, a further column is called ALM_CLASS which contains information describing the alarm class, a further column is called ALM_TYPE which contains information describing an alarm type, a further column is called SEVERITY which contains information indicating an alert severity, further columns are called START_TIM and END_TIM which respectively contain information indicating the start and end times associated with the alert described in the alert record. The start time and end time values collectively constitute time-duration information.

The alarm records in the alarm record table of FIG. 13 include a SEVERITY field. For example, a Yellow severity level is for conditions less severe than a Red severity level. In a sense, a Yellow severity level might be a warning level while a Red severity level may constitute a critical level. For example, consuming greater than 90% CPU for one minute might be a Yellow condition, while consuming greater than 95% for five minutes might be a Red condition. The LIMIT field (column) is a threshold that was exceeded for a respective alarm. For example, it could be that the limit was a latency of 100 msec and the measured value for latency was 150 msec.

In one embodiment, the performance of the analytics necessary to operate alarms/sensors may be performed by the data collection agent 16—it can be implemented as one of its built-in functions, even though the alert detection system 26 is shown as separate block. The alarm evaluation/detection part happens as data is collected by the data collection agent 16, while the sensors part are evaluated on a programmed time period. Both are integral parts of the data collection agent process. The data collection agent 16 thus can be configured to evaluate the alarms and sensors. The alarm part of the alert detection system 26 can therefore be a built-in feature of the data collection agent 16, except for configurable thresholds. The sensors in contrast may be purely a configuration that is downloaded and processed, for example, by general-purpose sensor processing code in the data collection agent 16. So sensors (i.e., newer technology) can be more flexible as they are field configurable. It should be appreciated that the foregoing merely describes one embodiment. An alternative embodiment is to configured the alert detection system (i.e., operate the alarms and sensors) remotely on another computer system that is configured to access the local data store, or to use a central data store and central alarm/sensor processing ability. In this alternative embodiment, it would still be per-system in concept, but performed from a central location.

FIG. 5 is a simplified diagrammatic and block diagram view showing aspects of the apparatus 10—as implemented in the master computer system $12_1$. In the illustrated embodiment, the master computer system $12_1$ includes an electronic processor $34_1$ and an associated memory $36_1$. The processor $34_1$ may include processing capabilities as well as an input/output (I/O) interface through which processor $34_1$ may receive a plurality of input and generate a plurality of outputs. Memory $36_1$ is provided for storage of data and instructions or code (i.e., software) for processor $34_1$. Memory $36_1$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

In an embodiment, memory $36_1$ stores executable code which when executed by the processor $34_1$ performs a number of functions as described herein for the apparatus 10, for example, code to perform the analysis module 28 functionality as described herein and code to perform the user reporting interface 30 functionality as described herein. These functions together contribute to the overall performance of the method and apparatus for determining one or more candidate causes of a user experience degradation of a managed computer system, described herein. In addition, more generally, the master computer system $12_1$ will include (1) an operating system (not illustrated) where the managed computer system may be a Windows-based computer, macOS-based computer, or a Linux-based computer and (2) a plurality of application programs suited in function and operation to the purpose(s) of the user(s) of the master computer system $12_1$. The master computer system may be embodied in a per-system-collection "on premises" solution, or may be embodied in a cloud-delivered solution.

The analysis module 28 is configured to analyze alert records and change records (which are collectively designated by reference numeral 44 in FIG. 5) in order to output one or more candidate causes of a user experience degradation. In an embodiment, the analysis module 28 is configured to select one or more of the alert records in the condensed database $18_1$, based on predetermined qualifying criteria, which includes whether the alert, based on at least the time-duration information, occurred in or during a predetermined lookback period. The analysis module 28 is further configured to identify, for each of the selected alert records (i.e., those alert records selected based on their time of occurrence), any corresponding change records that precede-in-time the respective selected alert records. This identification of change records is based at least in part on the time stamps of the change records as well as the time-duration information of the selected alert records. As a result, the identified change records are time correlated with detected alerts. In a further embodiment, the correlation may involve statistical processing of the alert data/change data collected from a large number of managed computer systems $12_i$.

With continued reference to FIG. 5, the user reporting interface 30 is configured to allow the user to interact with the analysis module 28 in order to generate various reports and obtain other information.

FIGS. 6-11 are flowcharts illustrating the operation of embodiments consistent with the instant teachings.

Figure 6:
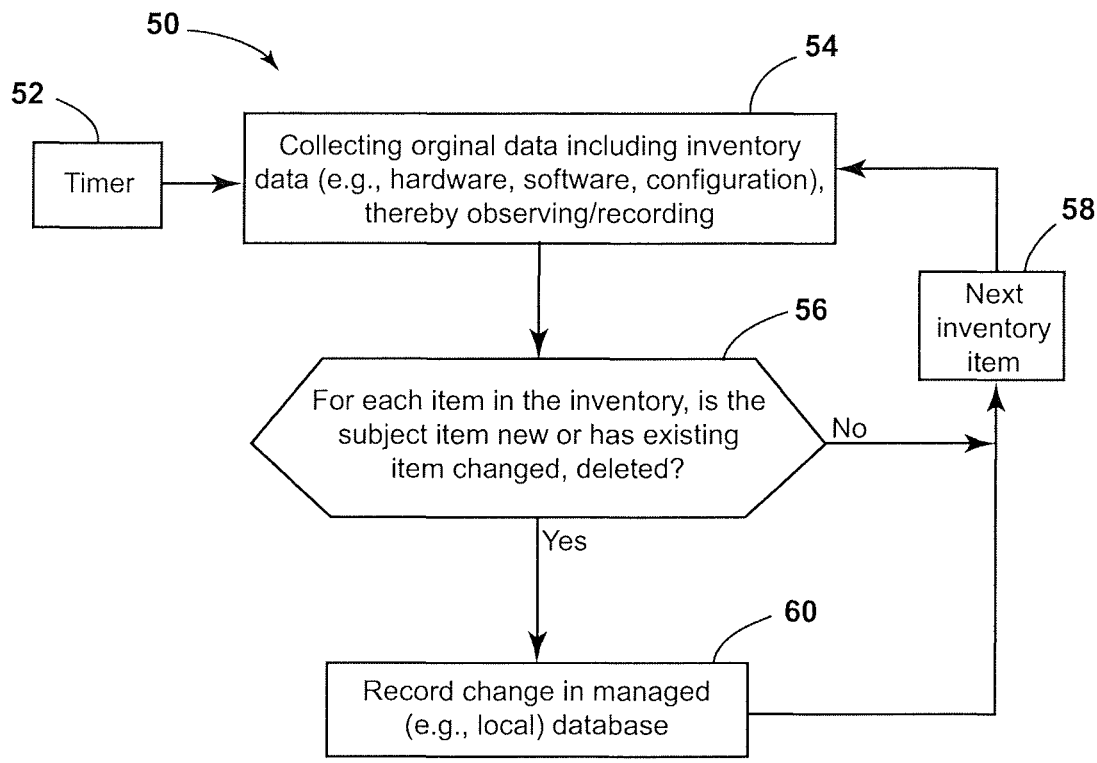
FIG. 6 is a simplified flowchart showing operation of the data collection agent and change recording system blocks, in an embodiment, in the managed computer system of FIG. 2.

FIG. 6 in particular is a simplified flowchart showing a method 50 of operation of the data collection agent 16 and change recording system 24 in a managed computer system $12_i$. At predetermined times, as determined by a timer 52, the data collection agent 16 collects, at step 54, original data including inventory data (e.g., hardware, software, configuration data, etc.) on the managed computer system $12_i$. In embodiments, it is contemplated that there will be many such managed computer systems, and thus it should be understood that the flowchart 50 of FIG. 6 is not limited to a single managed computer system and may be performed on a plurality of such managed computer system $12_i$ in the network 14. In an embodiment, apparatus 10 is configured to leverage knowledge gained through analysis of a large collection of information obtained from such managed computer systems $12_i$ in order to make its evaluations and outputs as described herein. It is contemplated that the larger the collection of managed computer systems $12_i$, the better the embodiments will perform. The method proceeds to step 56.

In step 56, the change recording system 24 is configured to process, through evaluating of the inventory data, to determine whether the subject inventory item under evaluation is new or otherwise represents a change to an existing item. If the answer is YES, then the method proceeds to step 60. If the answer is NO, then the method proceeds through step 58 to evaluate the next inventory item, returning to step 54 which is being performed substantially continuously.

In step 60, the change recording system 24 records (saves) change records, in an embodiment, corresponding to the determined changes (e.g., "add", "delete") along with at least associated time-stamp information indicating when the change was determined. The method then flows through step 58 to evaluate the next inventory item, and returns to step 54 as described above.

Figure 7:
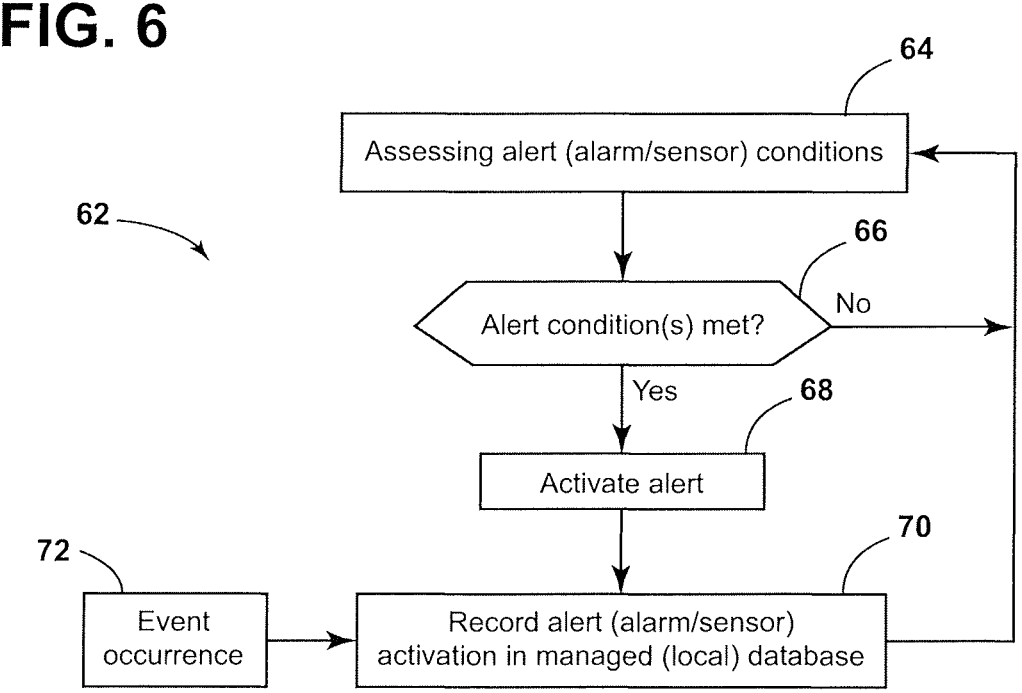
FIG. 7 is a simplified flowchart showing operation of the alert detection system block, in an embodiment, in the managed computer system of FIG. 2.

FIG. 7 is a simplified flowchart showing a method 62 of operation of the data collection agent 16 and the alert detection system 26. In an embodiment, the data collection agent 16 via the alert detection system 26 operates substantially concurrently with other operations described herein in the managed computer system(s) $12_i$ and the master computer system $12_1$. In this regard, in an embodiment, the data collection agent 16 may be configured to cause the alarms and sensors to be evaluated via the alert detection system 26. In an embodiment, the data collection agent 16 on each managed computer system $12_i$ operates autonomously with respect to the master computer system $12_i$ and with respect to other managed computer systems $12_i$ and executes directly on the managed computer system $12_i$. This approach has advantages for scale, mobility, cloud, and privacy. In an alternative embodiment, the data collection agent 16 may be operated remotely from another system. The method begins in step 64, where the data collection agent 16 causes the alert detection system 26 to cause the pre-defined alerts (i.e., alarms and sensors, as described above) to be evaluated, for example, by determining, for each alert, whether the underlying associated conditions have been satisfied, as shown in step 66. If the answer is NO, then flow of the method returns to step 64. If the answer is YES, then the subject alert being assessed is activated. The method proceeds to step 70.

In step 70, the data collection agent 16 in connection with the alert detection system 26 records (saves) alert records, corresponding to the activated alerts (alarms or sensors) in the associated local database indicating the activation of the alert along with other information, such as time duration information (e.g., start time and end time). In an embodiment, an alert may be directly activated by virtue of the occurrence of a pre-defined event, such as shown originating in block 72. The method flow then returns to step 64.

Figure 8:
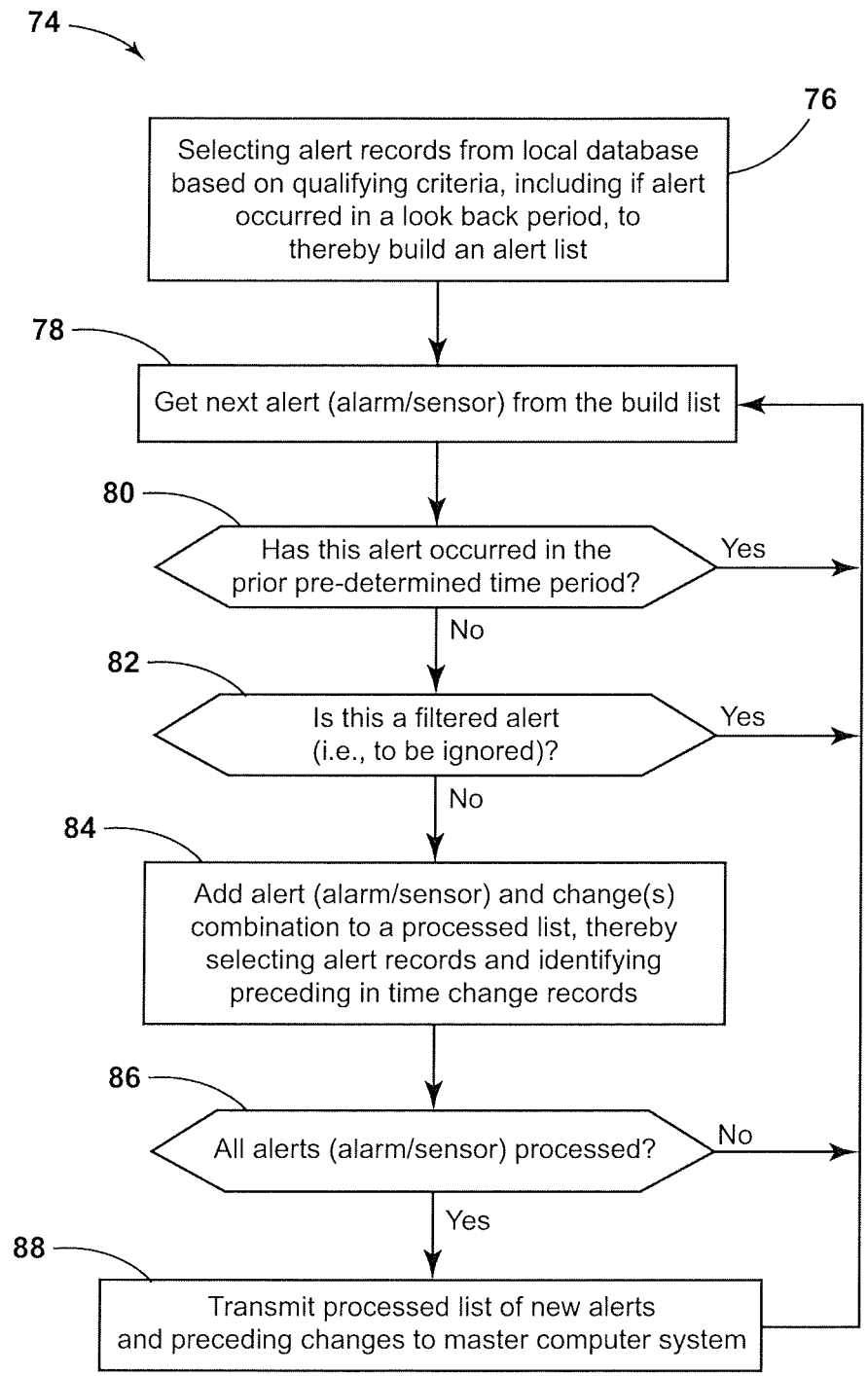
FIG. 8 is a simplified flowchart showing operation of the condenser agent of FIG. 1, in an embodiment, extracting change records possibly related to recent alerts (i.e., alarms/sensors).

FIG. 8 is a simplified flowchart showing operation of the condenser agent 20 at a managed computer system $12_i$. Generally, as the change recorder system 24 saves change records 40 to the local database $18_i$, those change records 40 are available for selection and subsequent transmission to the master computer system $12_1$. The selection(s) are made via the condenser 20 according to a predetermined strategy. The transmitted information is then stored in the condensed database 18$_1$ associated with the master computer system 12$_1$. These transmitted information, including the relevant change records, are thereafter accumulated by being stored in the condensed database 18$_1$ as time-stamped change records 40, which reflects the changes that have occurred on all of the managed computer systems 12$_i$ in the network 14. In an embodiment, the condenser 20 may also perform a filtering function on the change records, such that common, relatively benign changes (e.g., such as network address changes) may not be sent to the condensed database 18$_1$, which can be effective in reducing the size of the condensed database 18$_1$, improving the speed of searches, and also improving the analytics that result.

With continued reference to FIG. 8, the method 74 of the operation of the condensing agent 20 begins in step 76. In step 76, the condensing agent 20 is configured to select, based on qualifying criteria, alert records from the local database 18$_i$ associated with the managed computer system 12$_i$ under assessment. In an embodiment, the qualifying criteria includes whether the alert occurred in or during a pre-defined lookback time period, for example, during the preceding day (i.e., yesterday). Any alert records so selected are included in a build list for further processing. The method proceeds to step 78.

In step 78, the condensing agent 20 begins processing all the alert records selected in step 76 (i.e., in the build list). Thus, in step 78, the condensing agent 20 gets the next alert (i.e., alarm/sensor) from the build list created in step 76. The method proceeds to step 80.

In step 80, the condensing agent 20 determines whether the subject alert being evaluated has occurred in a prior predetermined time period (e.g., one week). The goal is to determine whether this particular alert has occurred in the past and if so, to bypass it for present purposes of transmitting it upstream to the master computer system 12$_1$/condensed database 18$_1$. At a fundamental level, a goal of embodiments consistent with the instant teachings is to correlate alerts (alarm and/or sensor activations) with noted changes to determine whether specific changes cause specific problems, or whether specific problems are caused by specific changes. But this task may be further complicated by certain common conditions. First, in normal operation, it is possible that certain alerts (alarms and sensors) may be triggered periodically. For example, it is common that a managed computer system might periodically trigger a high CPU or low memory alarm. For such problems, it is only possible to determine the cause when the problem first appears; if one examines the managed computer system in steady state operation, one might wrongly draw conclusions about which changes caused the underlying problem. Accordingly, when the answer is YES (i.e., this alert already occurred during the recent past, such as during the past one week), then the subject alert will not be transmitted to the condensed database since it is not new and thus the method will flow to step 78 where the next alert in the build list is picked up for evaluation. When the answer is NO, then the method proceeds to step 82.

In step 82, the condensing agent 20 is configured to determine whether the subject alert comprises a so-called filtered alert (i.e., an alert of the type that is to be ignored). As described above, certain alerts may be relatively benign and may be skipped. When the answer is YES, then the subject alert will not be transmitted to the condensed database, and thus the method flows to step 78 where the next alert in the build list is picked up for evaluation. When the answer is NO, then the method proceeds to step 84.

In step 84, the condensing agent 20 is configured to identify any change records that are correlated to the subject alert, for example, by determining whether there are any such change records which preceded-in-time the subject alert. This identification step may be determined based on the time-stamp of the change record as well as the time-duration information associated with the subject alert. It should be understood that a predetermined time period preceding the time-stamp may be increased or decreased to increase or decrease the selectivity of the time-based correlation. The subject alert as well as any identified preceding-in-time change records are added to a processed list. In an embodiment, the time period may be two weeks, which is configurable, although it should be understood that the time period selected could potentially be different time periods for different changes, as there may be an inherent period in which one would expect to see an effect from the change. As described, the time period in an embodiment may be set at two weeks for all change types.

The method proceeds to step 86, where the condensing agent 20 determines whether all of the alert records on the build list have been processed. If the answer is NO, then the method proceeds back to step 78 to pick up the next alert record on the build list. If the answer is YES, then the method proceeds to step 88.

In step 88, the condensing agent 20 transmits to the master computer system 12$_1$ all the processed alerts and the identified change records associated therewith, which were put on the processed list in step 84. The master computer system 12$_1$ is configured to store and thereby accumulate this data in the condensed database 18$_1$.

Table 1 below shows a sample query that can be used on a managed computer system 12$_i$ at the local database 18$_i$ level that extracts the change data (records) that may be related to recent alarms, as described above in connection with FIG. 8. This query would, for example, operate on the change records 40 (see FIG. 12 for example change records) based on any alert records 42 that were selected in accordance with step 76 of FIG. 8. The resulting processed list (i.e., data—see step 84) then gets sent by the condensing agent 20 to the master computer system 12$_1$.

TABLE 1

| Example Query on Managed Computer System | |
| --- | --- |
| SELECT DISTINCT TABLE4.wguid | AS WGUID, |
| TABLE4.alm_class | AS ALARM_CLASS, |
| TABLE4.alm_item | AS ALARM_ITEM, |
| TABLE4.start_tim | AS START_TIME, |
| TABLE4.end_tim | AS END_TIME, |
| TABLE4.almnumber | AS ALARM_NUMBER, |
| TABLE4.alm_inst | AS ALARM_INSTANCE, |
| TABLE4.alm_type | AS ALARM_TYPE, |
| TABLE3.keyname | AS KEYNAME, |
| TABLE3.changetype | AS CHANGE_TYPE, |

TABLE 1-continued

Example Query on Managed Computer System

```
                TABLE3.chgdesc         AS CHANGE_DESCRIPTION,
                TABLE3.changetime      AS CHANGE_TIME,
                TABLE3.fieldname       AS FIELD_NAME,
                TABLE3.tablename       AS TABLE_NAME,
                TABLE3.newvalue        AS NEW_VALUE,
                TABLE3.oldvalue        AS OLD_VALUE,
                TABLE3.chgclass        AS CHANGE_CLASS
FROM    (SELECT TABLE2.*
   FROM    (SELECT wguid,
                       alm_class,
                       alm_type,
                       alm_item,
                       start_tim,
                       end_tim,
                       almnumber,
                       alm_inst
            FROM    saalarm
            WHERE   start_tim > now − 1
                    AND alm_type <> 13) TABLE2
        LEFT JOIN (SELECT wguid,
                             alm_class,
                             alm_type,
                             alm_item,
                             start_tim,
                             alm_inst
                     FROM    saalarm
                     WHERE   start_tim < now − 1
                             AND start_tim > now − 8
                             AND alm_type <> 13) TABLE1
            ON TABLE2.wguid = TABLE1.wguid
               AND TABLE2.alm_class = TABLE1.alm_class
               AND TABLE2.alm_type = TABLE1.alm_type
               AND TABLE2.alm_item = TABLE1.alm_item
               AND TABLE2.alm_inst = TABLE1.alm_inst
   WHERE    TABLE1.wguid IS NULL)TABLE4
   LEFT JOIN (SELECT wguid,
                         keyname,
                         changetype,
                         chgdesc,
                         changetime,
                         fieldname,
                         tablename,
                         oldvalue,
                         newvalue,
                         chgclass
                 FROM    sachanges
                 WHERE   changetime < now − 1
                         AND changetime > now − 8
                         AND chgdesc NOT LIKE 'Definition Update for %'
                         AND chgdesc NOT LIKE 'MpKsl%') TABLE3
        ON TABLE4.wguid = TABLE3.wguid
```

Figure 9:
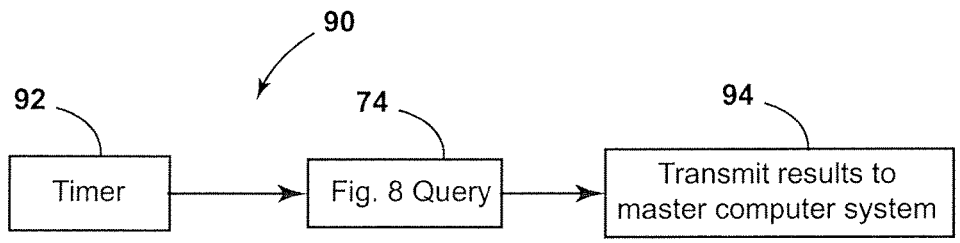
FIG. 9 is a simplified flowchart showing the timer-based execution of the query illustrated in FIG. 8.

FIG. 9 is a simplified flowchart showing the operation 90 of the condensing agent 20. A timer 92, which may be pre-configured, causes at predetermined times the method 74 of FIG. 8 to be executed with the results being transmitted (see box 94) to the master computer system 12$_1$.

Figure 10:
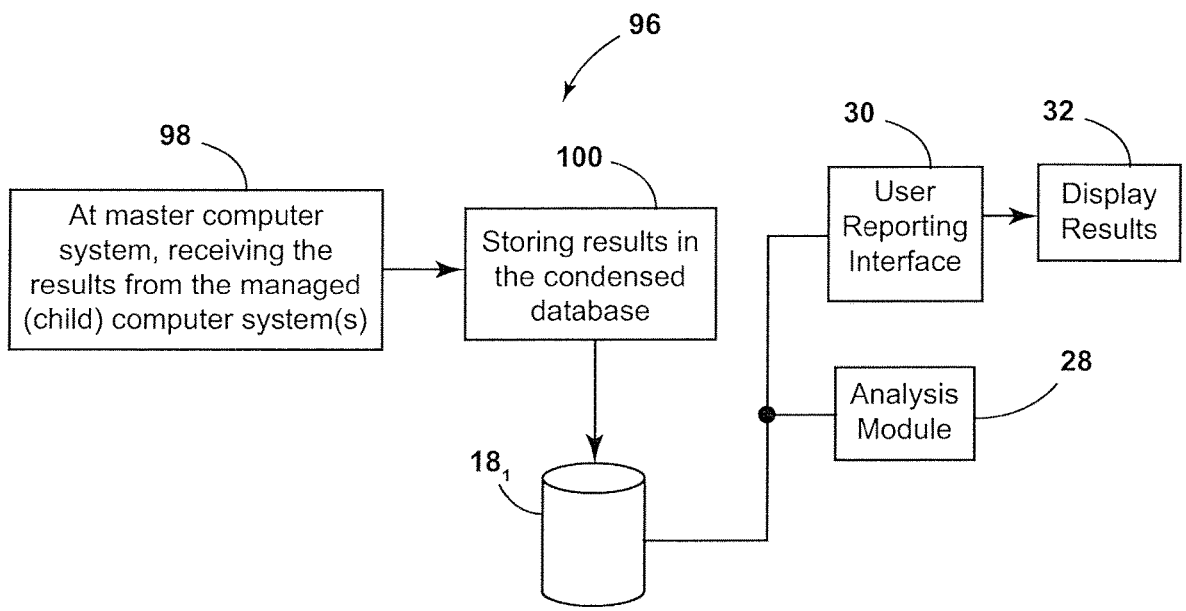
FIG. 10 is a simplified flowchart and block diagram showing, in an embodiment, an upstream flow of alert records and time-related change records for storage and further processing in the master computer system.

FIG. 10 is a simplified flowchart and block diagram showing, in an embodiment, the method 96 of alert records and time-related change records that flow from the various managed computer systems 12$_i$ to the master computer system 12$_1$ for storage and processing therein. In block 98, the master computer system 12$_1$ receives results from the managed computer system(s) 12$_i$, but it should be understood that even though the method 90 of FIG. 9 is shown for only one managed computer system, it is contemplated that it will be performed for a plurality of managed computer systems with resultant inbound data from the condensing agents 20 being collectively received in block 98.

In block 100, the master computer system 12$_1$ is configured to store the received results in the condensed database 18$_1$. As shown in FIG. 10, the analysis module 28 and the user reporting interface 30 having outputs block 32 are in communication with the condensed database 18$_1$.

As a result of the aggregation of alert data (i.e., alarm and sensor data) along with change record information that is time-correlated, the analysis module 28 is configured to evaluate the aggregated data. While association of specific changes with specific problems on a single managed computer system may provide correlation results that can be used, the more useful results may be obtained from analyzing the data from a large body of accumulated information (i.e., performing that function in the aggregate over all condensed system data affords new opportunities and improved results).

In an embodiment, the analysis module 28 may be configured to examine alerts (alarms and sensors) for newly detected alerts (alarms or sensors) that are triggered, but may be configured to use the historical records of such alerts to determine whether the condition is a new condition on a specific local managed computer system 14 or whether it is an ongoing condition. Since the condensed database 18$_1$ contains the history of the alerts (both alarm and sensor activations) incurred by all the managed computer systems $12_i$, the analysis module 28 can be configured to flag the specific alerts that represent new conditions. This filtering approach has the effect of eliminating substantial noise from the system and method for determining candidate causes of user experience degradation.

In an embodiment, once new alerts (alarm or sensor) are identified, such embodiment is configured to review recent changes detected on such managed systems to learn the potentially causative change. There may be many potentially causative changes for one given new alert; this is a set of potentially causative changes, although in actuality, it is often the case that only one of such changes is actually the causative change. Since a specific change might not instantly trigger an alert, due to the fact that not all problems happen all the time, and the change may sometimes cause a gradual decay on the subject managed computer system to begin with, the analysis module 28 may be configured to record all changes within a predetermined time period, such as for example only, the previous two weeks. The interval used is configurable, and may be adjusted in some environments to match needs and behaviors.

The analysis module 28 is further configured to examine the collection of local managed computer system $12_i$ data in the condensed database $18_1$ by newly activated alarms or sensors, as detected above, and is further configured to collects or determine statistics about the frequency at which specific changes are in the collection of potentially causative changes drawn from all of the managed computer systems $12_i$. The more managed computer systems $12_i$ that are in the set, the better the statistical analysis results from the condensed data $18_1$.

Using statistical analysis techniques, the analysis module 28 is configured to associate a determined probability with each change. In one case, a simple determination of how many managed computer systems $12_i$ have a specific change in the potentially causative change set for a new specific alarm or sensor yields a simple percentage, where a result that exceeds a configured value such as 60%, indicates a high probability. By ranking each of the potentially causative change, the user reporting interface 30 can present the user with a list of the calculated probabilities with each change for a given new alert; those changes with the highest correlation are mostly likely the cause. Other embodiments may use more advanced statistical techniques that are known in mathematics to achieve enhanced results.

In an embodiment, the apparatus 10 is configured to keep track of the time of the activation of the alarms and/or sensors as well as the time of each change. When the apparatus 10 assembles the aggregate data, attention is paid to the newly activated alarms, since those that were previously activated might not be related to a more recent change. For each new alarm found, the apparatus 10 is configured to look for changes that precede that in time by some amount (e.g., default being a week in an embodiment). That data gets sent to the master computer system aggregation point. It should be appreciated that not all changes occur at the same time for all the managed computer systems, so the logic is configured to look for the commonality of change preceding a new alarm, without strict attention paid to the absolute time of each new alarm on a managed computer system. The apparatus is configured to periodically purge this data (e.g., on a long term basis—for example 90 days or a year). It should be noted that the changes to a particular managed computer system might have the same effect on every managed computer system, but the changes do not necessarily occur at the same absolute time.

Figure 11:
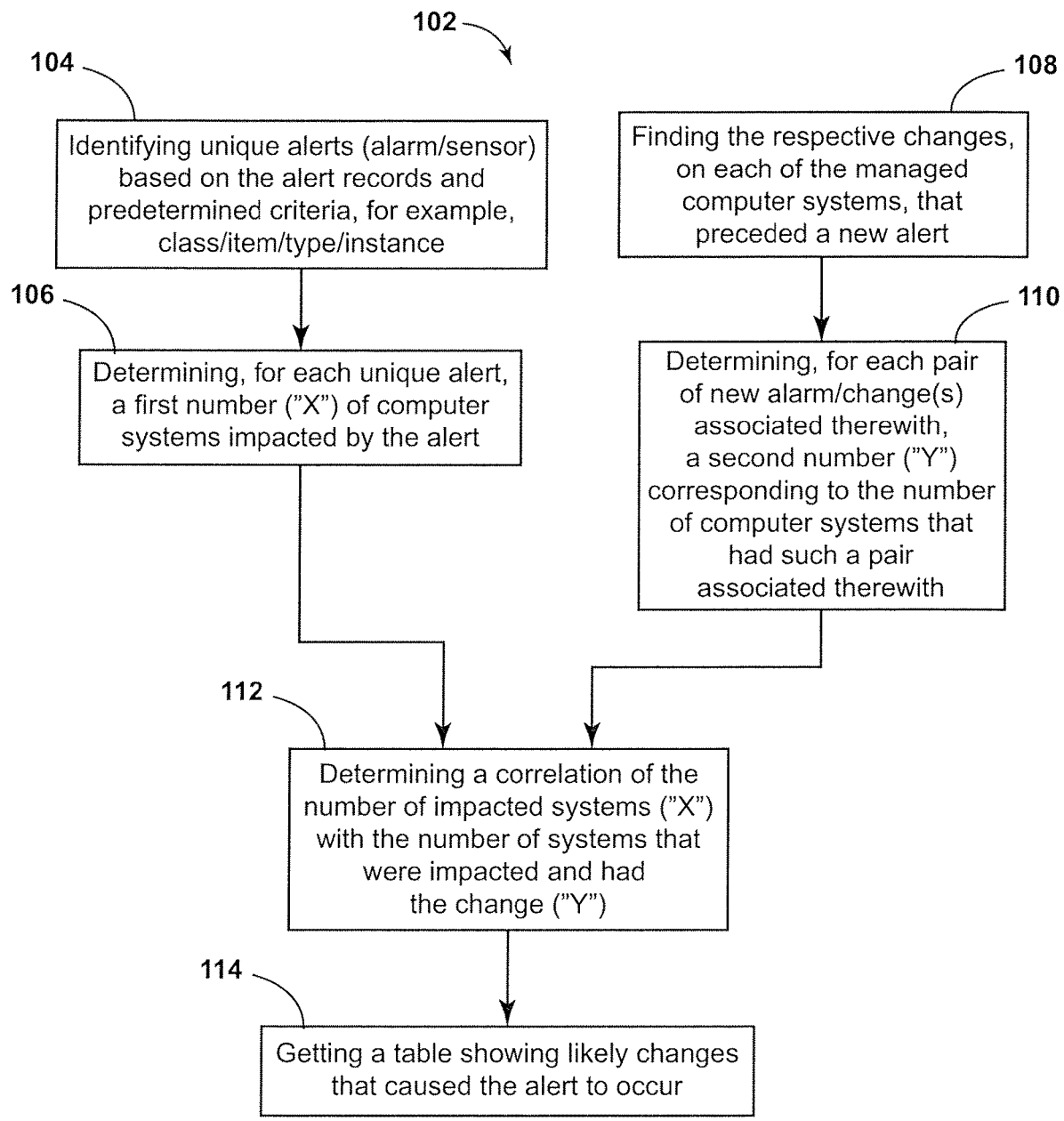
FIG. 11 is a simplified flowchart showing, in an embodiment, operation of the analysis module of FIG. 3.

FIG. 11 is a simplified flowchart showing, in an embodiment, a method 102 of operation of the analysis module 28 in determining a set of likely (candidate) causes of a subject alert, and thus, of a user experience degradation. The method begins in step 104.

In step 104, the analysis module 28 is configured, in an embodiment, to identify unique alerts (i.e., alarm or sensor activations) based on predetermined uniqueness criteria, for example only, the class/item/type/instance value(s) (e.g., see table in FIG. 13). It should be emphasized that the analysis module 28 is considering the data contained in the condensed database $18_1$, i.e., all the alerts received from the one or more managed computer systems $12_i$. The method proceeds to step 106.

In step 106, the analysis module 28 is configured to determine, for each unique alert, a first number (call it "X") corresponding to the number of managed computer systems $12_i$ that were impacted by the subject, unique alert.

The method 102 also involves step 108, wherein the analysis module 28 is configured to find the respective changes (i.e., change records) on the managed computer systems $12_i$ that preceded the new alert. The method proceeds to step 110.

In step 110, the analysis module 28 is configured for determining, for each new alert (alarms/sensors)/detected change (change records) combination or pair, a second number (call it "Y") corresponding to the number of managed computer systems $12_i$ that had such pair associated therewith.

In step 112, the analysis module 28 is configured to determine a correlation of the number of impacted managed computer systems ("X") with the number of managed computer systems that were impacted and had the above-described alert/change pair ("Y"). The method proceeds to step 114.

In step 114, the user reporting interface 30 in communication with the analysis module 28 is configured to get a table showing the likely changes that caused the new/unique alert to occur as an initial matter.

EXAMPLE

For example, assume a number of managed computer systems exist in the network, namely, three in this example. Further assume that managed computer system no. 1 exhibited an alarm no. 1 and exhibited preceding-in-time change A and change B. Further assume that managed computer system no. 2 also exhibited the same alarm no. 1 but exhibited preceding-in-time change A and change C. Finally, further assume that managed computer system no. 3 exhibited the same alarm no. 1 but exhibited associated change A, change B, and change D. This example is therefore directed to the unique alarm no. 1 which has impacted three different managed computers. The analysis module 28 therefore determines that the number of managed computer systems $12_i$ that were impacted by the unique alarm (i.e., alarm no. 1) were three (3) in number (i.e., "X" is 3). The analysis module 28 further determines that three (3) managed computer systems $12_i$ had the alarm no. 1/change A pair, that two (2) managed computer systems $12_i$ had the alarm no. 1/change B pair, that one (1) managed computer system $12_i$ had the alarm no. 1/change C pair, and that one (1) managed computer system $12_i$ had the alarm no. 1/change D pair.

Accordingly, in this example, the analysis module 28 determines the candidate causes of alarm no. 1, expressed as a ratio/percentage, is as follows:

Cause A=Y/X=3/3=1.00 or 100%
Cause B=Y/X=2/3=0.67 or 67%
Cause C=Y/X=1/3=0.33 or 33%
Cause D=Y/X=1/3=0.33 or 33%

Without loss of generality, it should be appreciated that the above example deals with a single unique alarm but that a plurality of unique alarms may be processed, in an embodiment.

The Table 2 below is a sample query that can be performed by the analysis module 28 in the master computer system $12_1$ using data in the condensed database, that is configured to extracts correlation statistics at the master computer system level using the condensed alert (alarm and/or sensor data) and condensed change (record) data.

In the Table 2 below, the analysis module 28 is assembling in T1 the managed computer systems that have a given alarm and the number of managed computer systems that have each particular change, and in T2 is the total number of managed computer systems that have a given alarm. Then, the correlation calculation tells us what percentage of managed computer systems with a new alarm in T2 have the change in T1 for which the analysis module is calculating the percentages.

TABLE 2

```
SELECT T1.*,
       t1.num_systems * 100 / t2.num_systems AS CORRELATION
FROM   (SELECT alarm_class,
              Count(DISTINCT wguid) AS NUM_SYSTEMS,
              alarm_item,
              alarm_type,
              alarm_instance,
              keyname,
              table_name,
              field_name,
              new_value,
              old_value,
              change_type,
              change_description,
              change_class
       FROM   vualarmchanges_test
       GROUP BY alarm_class,
              alarm_item,
              alarm_type,
              alarm_instance,
              change_type,
              keyname,
              table_name,
              field_name,
              new_value,
              old_value,
              change_type,
              change_description,
              change_class) T1
   INNER JOIN (SELECT alarm_class,
              Count(DISTINCT wguid) AS NUM_SYSTEMS,
              alarm_item
       FROM   vualarmchanges_test
       GROUP BY alarm_class,
              alarm_item) T2
       ON T1.alarm_class = T2.alarm_class
       AND T1.alarm_item = T2.alarm_item
ORDER BY alarm_class
```

In embodiments consistent with the instant disclosure, overall the apparatus 10 can be used to identify possible changes that have caused various problems. First, consider a case where the apparatus 10 in an embodiment observes a system health score rapidly decrease, and sees this rapid decrease on many managed computer systems. This will be recorded. When the apparatus 10 observes the change log, it may find that a change to the network address and related information that indicates that the managed computer systems exhibiting the rapid decrease in system health score have been moved to a new subnet. The apparatus 10 may determine that the change (i.e., moved to a new subnet) and the problem (i.e., the rapidly decreasing health score) are related. Consider a second case where the apparatus 10 observes that disk input/output operations per second (IOPS) substantially increases for a number of the managed computer systems. The apparatus 10, upon analysis of the change log, may determine that on such managed computer systems it is found that a certain application has been upgraded. The change and effect may be thusly be linked. These connections are very difficult to find in practice, because not all managed computer systems are upgraded at the same time. Consider a third case where the apparatus 10 observes that a managed computer system exhibits a marked increase in boot time. The apparatus 10 may find in the change log that a particular new piece of hardware has been connected. If enough of the managed computer systems exhibit the same increase in boot time, the apparatus 10 may determine that the adding of the particular new hardware component caused the increased boot time.

Additionally, the following are a couple of examples where an changes to a managed computer system might end up setting an alarm: (1) consider a managed computer system where a software patch is applied to a device driver—the change to update the device driver software then has the impact of causing very high CPU consumption due to a bug. One might then find that all managed computer systems that receive the updated device driver change might have the same high CPU consumption; and (2) also consider a managed computer system where the user plugs a new USB device into their computer system, which is a detected change. But after doing so, a particular application such as the Skype for Business application crashes; an alarm would be set based on the detection of the Skype for Business application crash.

It is also possible for the analysis module 28 to be configured to work in a reverse direction from that described above. That is, for a given change selected from the condensed database $18_1$, the analysis module 28 may be configured to determine how many managed computer systems of all of the managed computer systems that made the specific change later experienced a new alarm or sensor activation after the implementation of that change and to output a metric indicative of the extent to which the given change results in a new alarm or sensor being activated. In an embodiment, the metric may correspond to a simple percentage of managed computer systems that show a new problem, which can be used to identify those changes that are likely to trigger problems. Other embodiments may use more advanced statistical techniques that are known in mathematics to achieve enhanced results.

One specific extension that is useful in embodiments consistent with the present teachings is to configure the analysis module to further perform these algorithms on meaningful sub-groups (e.g., sub-groups of managed computer systems) of data contained within the overall condensed database $18_1$ data. Such sub-groups could be either predetermined by humans, or could be automatically selected by using attributes and data in the condensed database $18_1$. This approach allows problem determination within specific areas of function, geography, or use case within the larger condensed database collection of information. For example, in respect of geographic distinctions, one possibility distinguishes one geographic office versus another geographic office. Another possibility to be considered is where a subset of managed computer systems are virtualized, and it is possible that some kind of problem that results from a change only happens on virtualized managed computer systems. If the apparatus were configured to group the managed computer systems by physical versus virtualized, the apparatus may observe the problems in the virtualized group that are masked by quantities if the view was only of the full managed computer system collection.

Another useful specific extension results from configuring such groups to match Windows deployment rings for scaled customers. Deployment rings may be used by network administrators to pilot/try new changes in smaller and more risk tolerant test groups, and then over time to advance the scale to increasingly large and less risk tolerant groups over time. A practical challenge in such an approach is how to make the determination of whether a given change did or did not cause problems in the earlier deployment rings. In the present teachings, if the deployment rings are configured as groups, it is possible to examine the impact of changes upon those groups quickly using the methodologies presented herein. This increases confidence and can accelerate the deployment process. In an embodiment of the instant teachings, a specific user interface 30 may be provided to deliver this functionality to the user. The foregoing numerous embodiment solves one or more problems known in the art.

It should be understood that further variations are possible. For example, in the above-described embodiments, a managed computer system may be located at a first location and a master computer system may be located at a second location different from the first location, and where certain portions of the processing as described above is performed at the managed computer system and certain other portions of the processing as described above is performed at the master computer system. However, in an alternate embodiment, the original data associated with the managed computer systems is transmitted and collected at the master computer system wherein all of the processing of apparatus 10 as described above is performed at the master computer system (e.g., determining change records, such as in FIG. 6 other than collecting original data in the first place, determining and/or detecting alarms and/or sensors as in FIG. 7, etc.). In a further alternate embodiment, different allocations still of the herein-described functionality as between the managed computer system(s) and the master computer systems are possible.

It should be understood that a processor, such as the electronic processor (i.e., computing unit) as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the various logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method for determining one or more candidate causes of a user experience degradation of a managed computer system, comprising:
   determining changes associated with the at least one managed computer system and storing, in a first data store, change records corresponding to the determined changes wherein the change records include respective time-stamps indicating when a respective change was determined;
   detecting at least one or more alerts associated with the at least one managed computer system wherein said detected alerts comprise at least one of an activated alarm and an activated sensor, each detected alert including respective time-duration information, and storing alert records corresponding to the detected alerts in the first data store;
   selecting one or more alert records from the first data store based on qualifying criteria including whether the alert, based on time-duration information, occurred in a predetermined lookback period;
   identifying, for each of the selected alert records, corresponding change records that precede the selected alert records in time based on the time-duration information associated with the selected alert records and the time-stamps of the change records; and outputting the candidate causes based on the identified change records.

2. The method of claim 1 wherein the managed computer system is a first managed computer system and the identified change records is a first set of identified change records, and wherein said determining changes, detecting alerts, selecting alert records, and identifying change records are performed with respect to a second managed computer system to produce a second set of identified change records.

3. The method of claim 1 wherein said determining changes, detecting alerts, selecting alert records, and identifying change records are performed with respect to a plurality of managed computer system so as to produce a plurality of sets of identified change records, said method further comprising:
transmitting, for each one of the plurality of managed computer systems, the selected alert records and the associated sets of identified change records to a master computer system for consolidation in a condensed data store at a master computer system;
determining a respective correlation between the change records and the alert records; and
outputting selected change records for each respective alert based on the determined correlations.

4. The method of claim 3 wherein the first data store is associated with the managed computer system at a first location and the condensed data store is associated with the master computer system at a second location that is different from the first location.

5. The method of claim 3 wherein the first data store and condensed data store are the same data store associated with the master computer system.

6. The method of claim 3 wherein determining correlation comprises:
identifying unique alerts based on the alert records in the condensed data store; determining, for each unique alert, a first number of the plurality of managed computer systems impacted by the alert;
finding, using the condensed data store, the respective changes on each managed computer systems that preceded in time the determined unique alerts;
determining, for each determined alert and change pair, a second number of the plurality of managed computer systems having the respective alert/change pair associated therewith; and
determining a correlation of the first number corresponding to the impacted managed computer systems with the second number corresponding to the impacted managed computer systems having the alert/change pair associated therewith.

7. The method of claim 6 wherein outputting the candidate causes comprises outputting managed computer system changes based on the determined correlation with alerts.

8. The method of claim 1 wherein each alarm has associated therewith a respective one or more alarm conditions and each sensor has associated therewith one or more sensor conditions, further comprising:
setting one of the alarms to an activated state when respective, associated alarm conditions are met and resetting said one alarm when the respective, associated alarm conditions are not met; and
setting one of the sensors to an activated state when the respective, associated sensor conditions are met and resetting said one sensor when the respective, associated sensor conditions are not met.

9. The method of claim 1 further comprising:
collecting original data including inventory data associated with components and operation of the managed computer system, wherein the components comprises at least one of hardware components, firmware components, operating system software, driver components, operating system kernel components, software packages and applications, configuration settings and operating data.

10. The method of claim 1 wherein the candidate causes of user experience degradation comprise at least one of software bugs, faulty hardware, incompatible components, improperly installed or configured elements, external conditions, changes in software, hardware, and configuration settings, and a managed computer system performance anomaly.

11. The method of claim 9 wherein determining changes comprises evaluating a subset of the collected original data corresponding to the inventory data and then outputting said change records that identify the changes that occurred and respective time-stamps indicating when each such change was determined.

12. The method of claim 11 wherein said changes include one of an addition of a component, the change of a component, and a deletion of a component.

13. The method of claim 9 wherein determining changes comprises evaluating a subset of the collected original data corresponding to the operating data and then outputting said change records that identify the changes that occurred and respective time-stamps indicating when each such change was determined.

14. The method of claim 13 wherein said changes include a variation in resource utilization.

15. The method of claim 8 wherein one of said alarms is activated when at least one of the associated alarm conditions is satisfied by the occurrence of an event associated with the managed computer system or when a measured value exceeds a predetermined threshold value for a predetermined period of time, and wherein one of the sensors is activated when at least one of the associated sensor conditions is satisfied by the occurrence of plural events or plural values exceeding respective predetermined threshold values for respective predetermined periods of times.

16. The method of claim 1 wherein said determining changes and detecting alerts are performed with respect to a plurality of managed computer system, and wherein said selecting alert records and identifying change records are performed with respect to a selected group of said plurality of managed computer system corresponding to a deployment ring so as to produce a plurality of sets of identified change records associated with the managed computer systems in the deployment ring.

17. An apparatus for determining one or more candidate causes of a user experience degradation of a managed computer system, comprising:
a data collection agent configured to collect original data including at least inventory data associated with components and operation of the managed computer system;
a change recording system configured to process said original data and determine changes associated with the managed computer system and to record, in a managed data store associated with the managed computer system, change records corresponding to said determined changes wherein said change records include respective time-stamps indicating when a respective one of said determined changes was determined;

an alert detection system configured to detect one or more alerts associated with the managed computer system, wherein each detected alert comprises one of an activated alarm and an activated sensor, wherein said one or more alerts each include respective time-duration information, said data collection agent being further configured to store alert records corresponding to said detected alerts in said managed data store;

a condenser module configured to select one or more alert records based on qualifying criteria including whether said alert, based on time-duration information, occurred in a predetermined lookback period, said condenser module being further configured to identify, for each of said selected alert records, corresponding change records that precede in time said selected alert records, based on said time stamps and said time-duration information, to thereby time correlate detected alerts with identified change records; and an analysis module configured to output said identified change records as corresponding to the candidate causes of user experience degradation.

18. The apparatus of claim 16, further comprising a plurality of managed computer systems including said at least one managed computer system, wherein said plurality of managed computer systems further includes first and second managed computer systems, and wherein a master computer system has associated therewith a condensed data store, respective condenser modules being disposed on said first and second managed computer systems wherein each condenser module is configured to transmit respective alert and change records to said master computer system for consolidation and storage in said condensed data store.

19. The apparatus of claim 18 wherein said analysis module is further configured to determine a respective correlation between the change records and the alerts records in the condensed data store and output selected changes for respective alerts based on the determined correlations.

20. The apparatus of claim 19 wherein said analysis module is further configured to determine correlation by identifying unique alerts based on said alert records in said condensed data store, determining, for each unique alert, a first number of said plurality of managed computer systems impacted by said alert, finding, using said condensed data store, respective changes on each managed computer system that preceded in time said determined unique alert, determining, for each determined alert and change pair, a second number of said plurality of managed computer systems having said respective pair associated therewith, and determining a correlation of said first number corresponding to said impacted managed computer systems with said second number corresponding to said impacted managed computer systems having said alert and change pair associated therewith.

21. The apparatus of claim 20 wherein said analysis module is further configured to determine managed computer system changes based on said determined correlation with alerts.

22. The apparatus of claim 18 wherein said managed data store is associated with the managed computer system at a first location and said condensed data store is associated with said master computer system at a second location that is different from the first location.

23. The apparatus of claim 18 wherein said managed data store and said condensed data store constitute the same data store and is associated with said master computer system.

24. An apparatus for analyzing the operation of a plurality of managed computer systems, comprising:

a data collection agent on each managed computer system configured to collect respective original data including at least respective inventory data associated with components and operation of each managed computer system;

a change recording system on each managed computer system configured to process respective original data and determine respective changes associated with the managed computer systems and to record, in a respective managed data store respective change records corresponding to said determined changes wherein said change records include respective time-stamps indicating when a respective one of said determined changes was determined;

an alert detection system on each managed computer system configured to detect one or more alerts associated with a respective managed computer system, wherein each detected alert comprises one of an activated alarm and an activated sensor, wherein said one or more alerts each include respective time-duration information, said data collection agent being further configured to store alert records corresponding to said detected alerts respective managed data stores;

a condenser module on each managed computer system configured to select one or more alert records based on qualifying criteria including whether said alert, based on time-duration information, occurred in a predetermined lookback period, said analysis module being further configured to identify, for each of said selected alert records, corresponding change records that precede in time said selected alert records, based on said time stamps and said time-duration information, and to transmit said alerts and identified change records to a master computer system for consolidation in a condensed database;

an analysis module on said master computer system that is configured to identify, based on said alert records and said change records in said condensed database and for a selected change, those managed computer systems of said plurality of managed computer systems that experienced at least one alert, and to output a metric indicative of the extent to which said selected change produced at least one alert.

25. The apparatus of claim 24 wherein said metric comprises a percentage.

* * * * *